US006922892B2

(12) United States Patent
Kim et al.

(10) Patent No.: US 6,922,892 B2
(45) Date of Patent: Aug. 2, 2005

(54) METHOD OF MANUFACTURING HEAD OF INKJET PRINTER

(75) Inventors: Il Kim, Suwon (KR); Seo-hyun Cho, Sungnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 10/200,973

(22) Filed: Jul. 24, 2002

(65) Prior Publication Data

US 2003/0101572 A1 Jun. 5, 2003

(30) Foreign Application Priority Data

Dec. 1, 2001 (KR) ........................................ 2001-75624

(51) Int. Cl.$^{7}$ ................................................. B23P 17/00

(52) U.S. Cl. ..................................... 29/890.1; 29/890.6

(58) Field of Search ............................ 29/890.1, 896.6; 219/121.71; 347/20, 44, 45, 47, 54, 56, 61

(56) References Cited

U.S. PATENT DOCUMENTS 5,455,998 A * 10/1995 Miyazono et al. ............ 29/611
5,594,292 A * 1/1997 Takeuchi et al. ............ 310/324
5,745,129 A * 4/1998 Moriyama et al. ............ 347/12
5,748,214 A * 5/1998 Usui et al. ..................... 347/70
5,953,029 A * 9/1999 Keefe et al. .................. 347/65

* cited by examiner

*Primary Examiner*—Carl J. Arbes
*Assistant Examiner*—Tai Nguyen
(74) *Attorney, Agent, or Firm*—Staas & Halsey LLP

(57) ABSTRACT

A method of manufacturing a head of an inkjet printer includes forming a heater on a substrate and also forming an ink feeding passage through the substrate in a vertical relation to a surface where the heater is formed, forming an ink chamber communicating with the ink feeding passage of the substrate; attaching the substrate to the nozzle plate, and forming a tapered nozzle in the nozzle plate, the tapered nozzle being narrower in diameter in an inside of the nozzle plate than an outside of the nozzle plate, by radiating a laser beam from inside toward the outside of the nozzle plate, wherein the substrate is used as a mask. Since the nozzle is formed by radiating the laser beam to the nozzle plate through the ink feeding passage of the substrate after attaching the nozzle plate to the substrate, the accuracy of the nozzle in form and position improves, and the nozzle of desirable structure of the improved ink discharge efficiency can be obtained by radiating the laser beam only once. Also, the manufacturing process becomes simpler, and due to improved manufacturing process, the productivity increases.

26 Claims, 5 Drawing Sheets

METHOD OF MANUFACTURING HEAD OF INKJET PRINTER

CROSS-REFERENCE TO RELATED APPLICATIONS

This application claims the benefit of Korean No. 2001-75624, filed Dec. 1, 2001, in the Korean Industrial Property office, the disclosure of which is incorporated herein by reference.

BACKGROUND OF THE INVENTION

1. Field of the Invention

The present invention relates to a method of manufacturing a head of an inkjet printer, and more particularly, to a method of manufacturing a head of an inkjet printer and forming a nozzle on a nozzle plate using a laser beam radiated on the nozzle plate through an ink passage of a substrate.

2. Description of the Related Art

Generally, inkjet printers are categorized into a bubble-jet type, a Mach type, a thermal type and a thermal compression type according to ways of discharging ink. The bubble-jet type printer ejects ink droplets by means of bubbles generated by a heating element heating liquid ink. The bubble-jet type printer includes a head having a nozzle plate formed at one side of an ink chamber wall of the head. The nozzle plate has a nozzle formed therein, and the ink chamber wall defines a space that serves as an ink chamber. Formed at opposite sides of the ink chamber wall are a heater and a plate. The heater is positioned in the ink chamber, and the plate has an ink feeding passage communicating with the ink chamber.

Recently, demands for an inkjet printer having a higher resolution and speed have increased, and in an attempt to satisfy the demands, manufacturers have been focused on ways to reduce the diameter of nozzles, increase the density of the nozzles and also the accuracy of the nozzles in terms of form and position. In one example of such heads of inkjet printers that have been developed and commercialized, the nozzle of the nozzle plate is tapered, i.e., the nozzle having a smaller diameter in an outside portion than an inside portion which is closer to the ink chamber, so that the ink is discharged through the nozzle more efficiently at the higher speed and with the higher resolution.

Generally, the head of the inkjet printer, which has the tapered nozzle as described above, is made through a process of forming the nozzle in the nozzle plate in a tapered pattern, and then attaching the nozzle plate to the substrate on which the heater is formed.

However, the above-described method has a problem. That is, since the nozzle plate is attached to the heater-formed substrate after the nozzle is formed in the nozzle plate, it is very difficult to increase the positional accuracy of the nozzle. Because of the low positional accuracy of the nozzle, when the nozzle, the ink chamber and/or the ink feeding passage of the ink chamber are not aligned with each other accurately, the orientation of the ink droplets is deviated when the ink droplets are ejected through the nozzle, and as a result, a printing image could not have a desirable resolution.

Another suggestion to solve the above-described problem is that the nozzle plate be attached to the heater-formed substrate before the nozzle is formed in the nozzle plate.

Although the nozzle, the ink chamber and/or the ink feeding passage of the substrate are aligned easily, this method also has a problem. That is, since the nozzle is formed in the nozzle plate after the nozzle plate is attached to the heater-formed substrate, the alignment of the heater on the substrate and the nozzle of the nozzle plate becomes difficult.

Also, according to the another suggestion, since the nozzle is formed after the nozzle plate is attached to the substrate, and since the nozzle has to be formed by radiating the laser beam from the outside of the nozzle plate toward the ink chamber, it is very difficult to form the nozzle in the tapered pattern, i.e., it is hard to form the nozzle to be narrowing in diameter from the inside portion to the outside portion (i.e., the nozzle narrow from the ink chamber to an outside of the nozzle plate), which is needed for the efficient discharge of the ink. Although the nozzle plate is subject to the laser beam with uniform width, since the outside portion of the nozzle plate receives the laser beam earlier, the outside portion of the nozzle plate absorbs more energy and thus is formed to be larger in diameter than other portions of the nozzle plate. In order to solve this problem, some suggestions have been made about the ways to form the nozzle in the tapered pattern, i.e., the nozzle to be narrowing from the inside portion to the outside portion.

FIG. 1 is a cross-sectional view showing a method of making a nozzle structure for the efficient discharge of the ink by varying an incident angle of a laser beam. As shown in FIG. 1, formed on a substrate 1 are a heater 2 and an ink chamber wall 4. The ink chamber wall 4 has a predetermined height for providing an ink chamber 3. A nozzle plate 5 is attached to the ink chamber wall 4. In a state that the substrate 1, the ink chamber wall 4 and the nozzle plate 5 are attached to each other, the laser beam is radiated to a certain location of the nozzle plate 5, which is designated to to form the nozzle 6. In order to obtain a nozzle of desirable structure, at least one laser beam is radiated from at least three different directions A, B, C at different incident angles. Here, in order to vary the incident angle, a plurality of laser beams are used, or the nozzle plate mechanically moves so as to vary the incident angle of the laser beam that is incident on the nozzle plate 5. However, it is difficult to align a plurality of laser beams to focus on the same nozzle formed area. It is also difficult to align the nozzle plate with respect to the laser beam by mechanically moving the nozzle plate, and accordingly, it is difficult to obtain the desirable nozzle structure for the efficient discharge of the ink, while the productivity deteriorates considerably due to a complicated manufacturing process.

FIG. 2 shows another method of forming the nozzle 6. In this example, the nozzle 6 is formed using laser beams having different shapes. The shape of a laser beam varies by an optical system 7, and a laser beam having the variable shape is radiated on the nozzle formed area to form the nozzle 6. In this method, the most important thing is to accurately focus the laser beam on the correct location of the nozzle plate. Accordingly, it is hard to obtain the desirable nozzle structure for the efficient discharge of the ink, and a considerable deterioration of productivity is unavoidable due to the complicated manufacturing process. A reference numeral 8 in FIGS. 1 and 2 is an ink feeding passage.

SUMMARY OF THE INVENTION

The present invention has been made to overcome the above-mentioned problems of the related art, and accordingly, it is an object of the present invention to provide a method of manufacturing a head of inkjet printer having a nozzle structure having an improved ink discharge efficiency for an efficient manufacturing process and an improved productivity.

Additional objects and advantageous of the invention will be set forth in part in the description which follows and, in part, will be obvious from the description, or may be learned by practice of the invention.

The above and other objects are accomplished by providing a method of manufacturing a head of an inkjet printer according to the present invention, in which a substrate having a heater and an ink feeding passage is attached to a nozzle plate to form an ink chamber communicating with the ink feeding passage and disposed between the substrate and the nozzle plate, and a laser beam is radiated on the nozzle plate to form a nozzle while using the ink feeding passage as a mask.

The nozzle is formed by radiating the laser beam on the nozzle plate through the ink feeding passage of the substrate after the nozzle plate is attached to the substrate. Accordingly, the accuracy of the nozzle in form and position increases, and, since the nozzle is tapered, i.e., the diameter of the nozzle becomes narrower from an inside portion to an outside portion of the nozzle, the nozzle having the improved ink discharge efficiency is formed only through the radiation of the laser beam once.

According to an embodiment of the present invention, the method of manufacturing the head of the inkjet printer includes forming the heater on the substrate and also forming the ink feeding passage through the substrate in a vertical relation to the surface where the heater is formed, forming the ink chamber communicating with the ink feeding passage of the substrate; attaching the substrate to the nozzle plate, with the ink chamber being between the substrate and the nozzle plate, and forming the nozzle by radiating the laser beam from the inside portion to the outside portion of the nozzle plate through the ink feeding passage of the substrate serving as a mask. The ink chamber can be formed in the substrate or in the nozzle plate.

According to another embodiment of the present invention, a method of manufacturing the head of the inkjet printer includes forming a heater on a substrate and also forming an ink feeding passage through the substrate in a direction vertical to a surface of the substrate on which the heater is formed, forming a sacrificial layer on the heater formed area of the substrate to form an ink chamber, forming an ink chamber wall portion by growing a layer on the substrate except the sacrificial layer formed area to a height of the sacrificial layer, forming a nozzle plate having a predetermined thickness by growing another layer on the ink chamber wall portion, forming an ink chamber communicating with the ink feeding passage of the substrate by removing the sacrificial layer of the substrate, and forming the nozzle in a portion of the nozzle plate by radiating the laser beam in an outward direction from the ink chamber toward the outside portion of the nozzle plate through the ink feeding passage of the substrate serving as a mask.

The sacrificial layer can be formed on the substrate before the ink feeding passage is formed. That is, after forming the heater on the substrate, the sacrificial layer can be formed on the heater formed area of the substrate to provide the ink chamber, and then the ink feeding passage is formed through the substrate in a vertical relation to the heater formed area of the substrate where the sacrificial layer is formed.

According to the present invention, a hydrophobic substance can be coated on an atmosphere contacting surface of the nozzle plate contacting air before the forming of the nozzle. Before the forming of the nozzle, an additional step of melting or washing away the by-products of the nozzle forming in the ink chamber can be performed.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
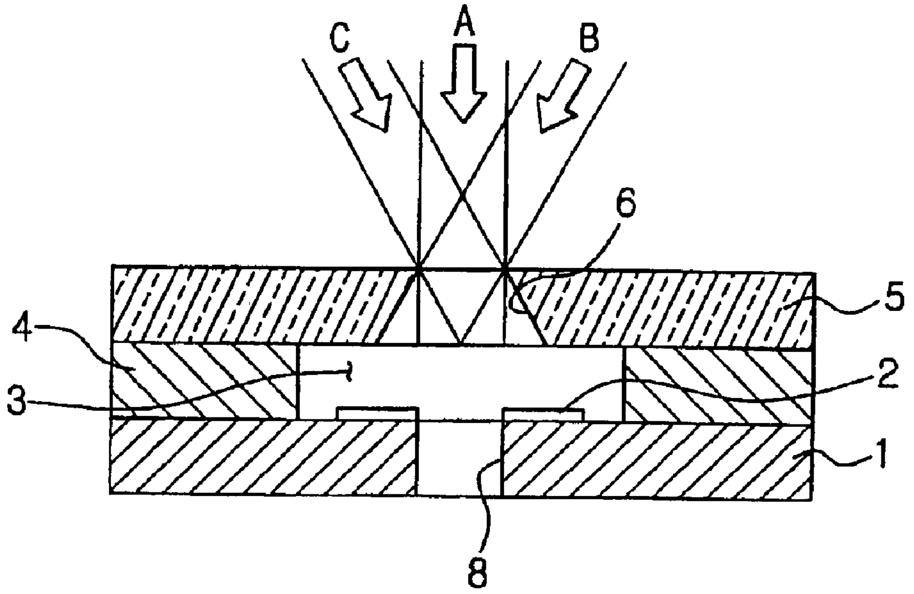
FIG. 1 (PRIOR ART)
FIG. 1 is a cross-sectional view showing a process of forming a nozzle according to a conventional method in a head of an inkjet printer.
Figure 2:
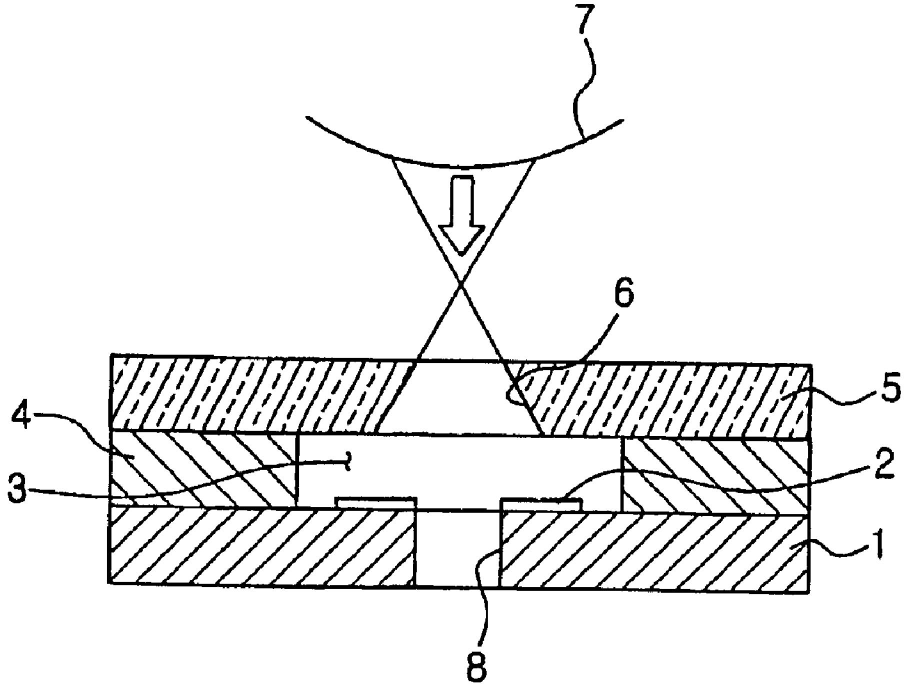
FIG. 2 (PRIOR ART)
FIG. 2 is a cross-sectional view showing a process of forming the nozzle according to another conventional method in the head of the inkjet printer.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

The preferred embodiment of the present invention will now be described with reference to the drawings.

Figure 3:
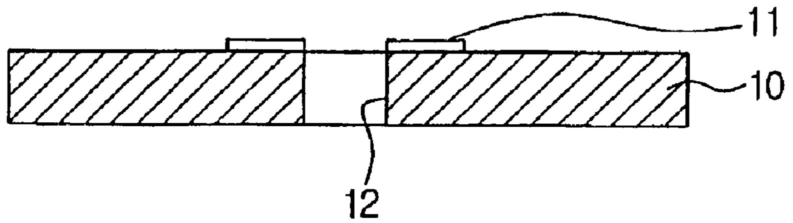
FIGS. 3 through 6 are cross-sectional views showing a method of manufacturing a head of an inkjet printer according to an embodiment of the present invention.

FIGS. 3 through 6 show a method of manufacturing a head of an inkjet printer according to an embodiment of the present invention. In the drawings, a reference numeral 10 refers to a substrate, 20 is an ink chamber wall, 30 is a nozzle plate and 40 is a nozzle.

of manufacturing the head of the inkjet printer of the present invention, first] First, as shown in FIG. 3, a heater 11 is formed on the substrate 10, while an ink feeding passage 12 is vertically formed through the substrate 11 in an area in the middle of where the heater 11 is formed. The other layers including a conductive layer, such as an electrode for supplying the heater 11 with electricity and a passivation layer are omitted. Although the heater 11 is formed in the shape of donut in consideration of the ink feeding passage 12, it is not strictly limited thereto.

Figure 4:
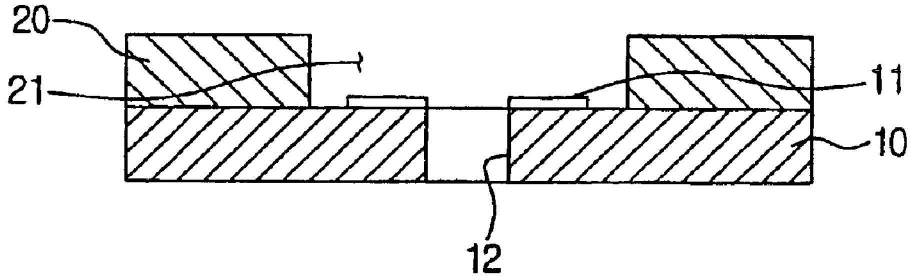

Next, as shown in FIG. 4, except for the heater-formed area of the substrate 11, the ink chamber wall 20 having a predetermined height is formed on the substrate 10 to form an ink chamber 21 communicating with the ink feeding passage 12 of the substrate 10.

The ink chamber 21 can be formed in many different ways. For example, a sacrificial layer can be formed on a heater-formed area of the substrate. After stacking certain materials on the substrate (excluding the heater-formed area) or forming the substrate to the predetermined height corresponding to the sacrificial layer, the sacrificial layer is removed to form the ink chamber 21. According to another example, a dry film (not shown), which is used to attach the nozzle plate 30 to the substrate 10, can be used as an ink chamber wall 20. More specifically, a space formed after removal of a portion of the dry film corresponding to the heater-formed area of the substrate, can be used as the ink chamber 21. According to still another example, the ink chamber 21 is formed in the nozzle plate 30. Since it is easier to laminate the dry film on the nozzle plate 30 in the absence of the nozzle 40 than to laminate the dry film on the substrate 10 having the ink feeding passage 12 and the heater 11, it is advantageous in the manufacturing process. The ink feeding passage 12 can be formed in the substrate 10 after the dry film is laminated on the substrate 10, considering both a relatively weak stiffness of the substrate 10 provided with the ink feeding passage 12 and a resultant breakage of the substrate 10 during the dry film laminating process.

Figure 5:
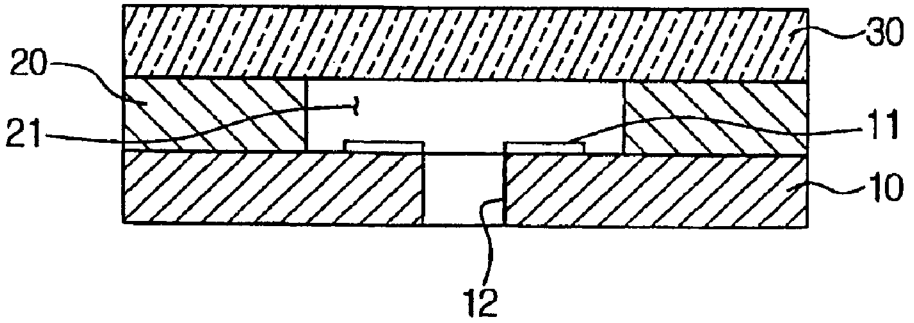

When the ink chamber 21 is formed, as shown in FIG. 5, the nozzle plate 30 is attached to the ink chamber wall 20 by an adhesive.

Figure 6:
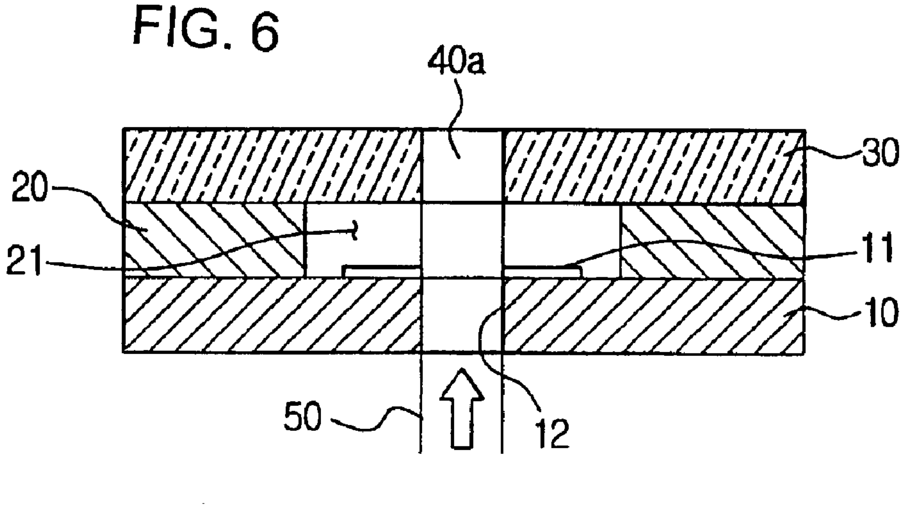
Figure 7:
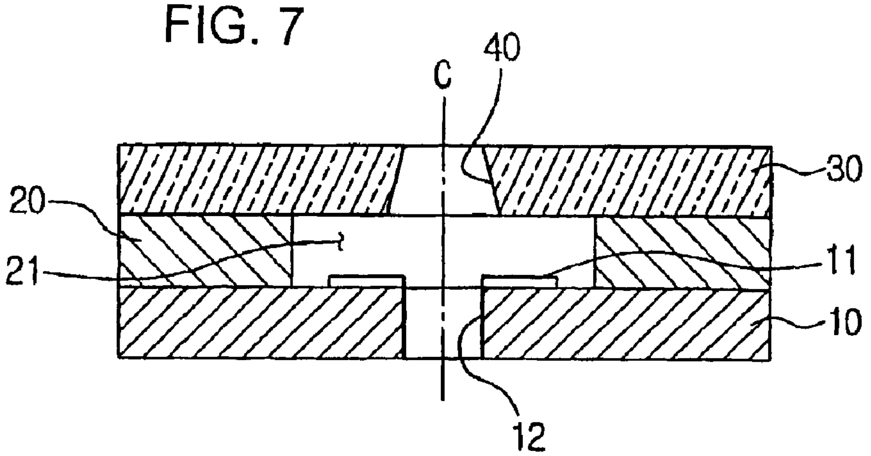
FIG. 7 is a cross-sectional view showing a head made according to the method of manufacturing the head of the inkjet printer shown in FIGS. 3 through 6.

Finally, as shown in FIG. 6, in a state that the substrate 10 and the nozzle plate 30 are attached to each other with the ink chamber wall 20 therebetween, a laser beam 50 is radiated on a nozzle-formed area 40*a* of the nozzle plate 30, while using the ink feeding passage 12 of the substrate 10 as a mask. As a result, a nozzle 40 is formed in the nozzle plate 30, serving as an ink ejecting passage through which the ink contained in the ink chamber 21 is ejected. The laser beam 50 is radiated in a direction from the ink feeding passage 12 through the ink chamber 21 to the outside of the nozzle plate 30, forming the nozzle 40 in a tapered pattern, i.e., the nozzle 40 having a smaller diameter in the outside portion than the inside portion of the nozzle 40 as shown in FIG. 7 since the inside portion of nozzle 40 absorbs the energy of the laser beam 50 in advance of the outside portion of the nozzle 40. It is possible that the diameter of the inside portion of the nozzle 40 is smaller than or equal to that of the ink feeding passage 12. The nozzle 40 is defined by a circumferential side surface of a frustum of a cone.

In the method of manufacturing the head of the inkjet printer according to this embodiment of the present invention, a hydrophobic substance can be coated on an atmosphere contacting outer surface of the nozzle plate 30 exposed to atmosphere prior to forming the nozzle 40 in the nozzle plate 30. It is easier to coat the hydrophobic substance on the nozzle plate 30 since the nozzle 40 is not formed yet.

When the nozzle 40 is formed in the nozzle plate 30 by the laser beam, a polymer substance of the nozzle plate 30 is sometimes vapor-deposited in the ink chamber 21 and the ink ejecting passage due to a laser aberration. Since such by-products could hinder the discharge of the ink, they should be removed. Accordingly, the method may include an additional operation of melting or washing the by-products of the nozzle plate 30 from the ink chamber 21 and the ink ejecting passage so as to remove the by-products. However, this additional operation is not necessarily included in the head manufacturing method since most of the by-products are discharged out of the ink chamber 21 through the ink feeding passage 12 because a plumb made of the by-products is formed by the laser aberration in proportion to three to five times of a cosine value of the incident angle of the laser beam. Even if some of by-products of the nozzle plate 30 are vapor-deposited in a contact area between the ink feeding passage 12 and the ink chamber 21, it will only lower the heat transfer rate a little and will not cause any serious problem. Further, after forming the nozzle, another additional operation of modifying an inner wall of the ink chamber 21 and the ink feeding passage 12 can be included to improve ink wettability of the ink chamber 21 and the ink feeding passage 12.

FIG. 7 is a cross-sectional view showing the head of the inkjet printer made according to the embodiment of the present invention. As shown in FIG. 7, the head of the inkjet printer includes the heater 11 and the ink feeding passage 12 formed on/in the substrate 10, and the ink chamber 21 formed at the heater-formed area communicating with the ink feeding passage 12. In order to provide a space for the ink chamber 21, the nozzle plate 30 is attached to the ink chamber wall 20 that is formed on the substrate 10 to the predetermined height. Also, the nozzle 40 formed in the nozzle plate 30 serves as a passage through which the ink contained in the ink chamber 21 is discharged.

The nozzle 40 is formed in the nozzle plate 30 in a tapered pattern, i.e., the nozzle 40 narrows in diameter from the inside toward the outside, for a more efficient discharge of ink and subsequent improvement in resolution and printing speed.

Since the nozzle 40 is formed by radiating the laser beam to the nozzle plate 30 that is attached to the substrate 10 while the substrate 10 is used as a mask, the nozzle 40 is easily aligned with the center axis (C) of the ink feeding passage 12, and as a result, a straightforwardness of the ink droplets is improved and the resolution of the printing image is increased.

Additionally, in contrast, the conventional method requires separate aligning equipment for and a process of aligning the nozzle 40 and the ink feeding passage 12 (because the nozzle 40 is formed by radiating the laser beam from outside portion of the nozzle plate 30 in a state that the substrate 10 and the nozzle plate 30 are attached to each other). According to the present invention, the head could maximize the ink discharge efficiency since the nozzle 40 and the ink feeding passage 12 are aligned with each other without requiring any separate aligning process.

Figure 8:
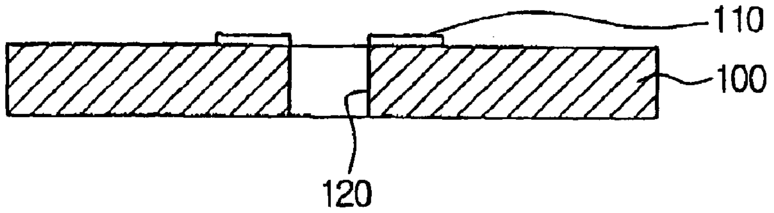
FIGS. 8 through 13 are cross-sectional views showing the method of manufacturing the head of the inkjet printer according to another embodiment of the present invention.

FIGS. 8 through 13 are cross-sectional views showing a method of manufacturing the head of the inkjet printer according to another embodiment of the present invention. In the drawings, a reference numeral 100 refers to a substrate, 200 is an ink chamber wall portion, 300 is a nozzle plate portion, 400 is a nozzle and 600 is a sacrificial layer.

embodiment of the present invention, first] First, as shown in FIG. 8, a heater 110 is formed on the substrate 100, while the ink feeding passage 120 is formed through the substrate 100 in a vertical relation to an surface of the substrate 100 where the heater 110 is formed.

Figure 9:
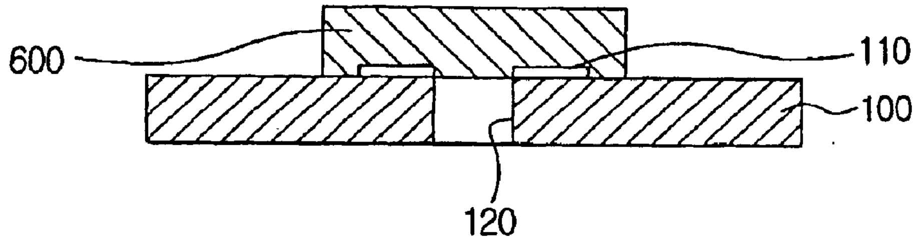

Next, as shown in FIG. 9, a sacrificial layer 600 is formed on a heater-formed area to a predetermined height for providing a space for an ink chamber 210. In some cases, the sacrificial layer 600 can be formed prior to the forming of the ink feeding passage 120. Particularly when substances of high flexibility, like a dry film or a liquid photo-register for example, are used, since it is hard to shape the sacrificial layer 600 accurately, the sacrificial layer 600 can be formed prior to the forming of the ink feeding passage 120.

Figure 10:
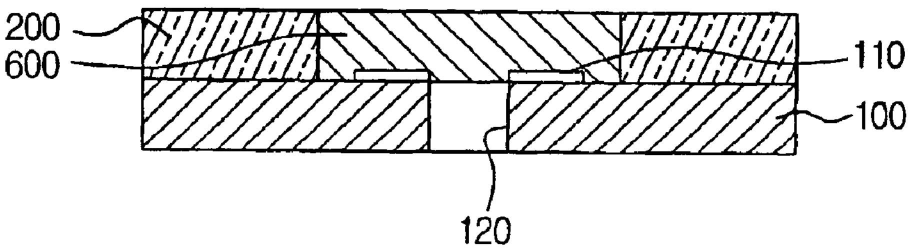

After forming the sacrificial layer 600 on the substrate 100, as shown in FIG. 10, a semiconductor layer of the substrate 100, except the sacrificial layer formed area, is grown on the substrate 100 to the height of the sacrificial layer 600 using semiconductor manufacturing processes, to thereby form the ink chamber wall portion 200.

Figure 11:
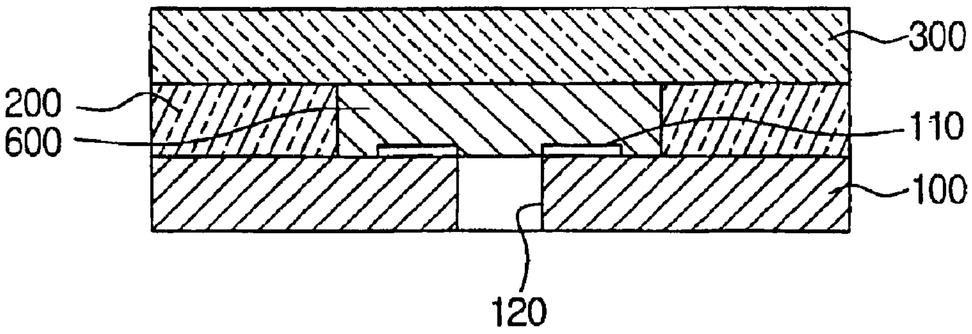

Then by growing another semiconductor layer on the layer of the ink chamber wall portion 200, which is grown on the substrate 100, using a semiconductor manufacturing process, as shown in FIG. 11, the another layer of the nozzle plate portion 300 having a predetermined thickness is formed. In other words, the ink chamber wall portion 200 and the nozzle plate portion 300 are formed in consecutive processes.

Figure 12:
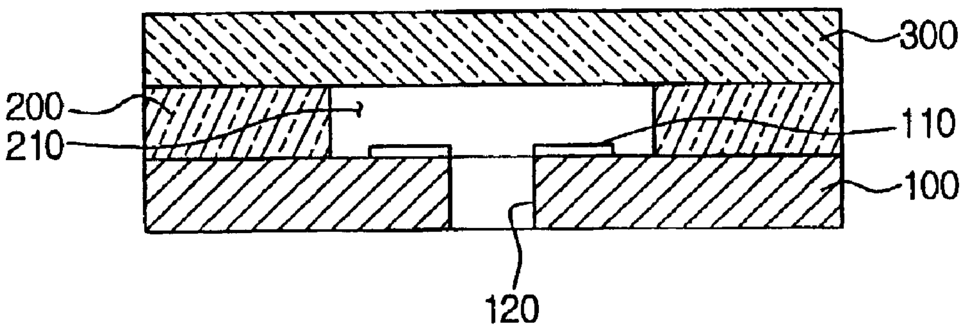

After the forming of the ink chamber wall portion 200 and the nozzle plate portion 300, the sacrificial layer 600 is removed from the substrate 100 to form the ink chamber 210 communicating with the ink feeding passage 120 of the substrate 100 as shown in FIG. 12.

Figure 13:
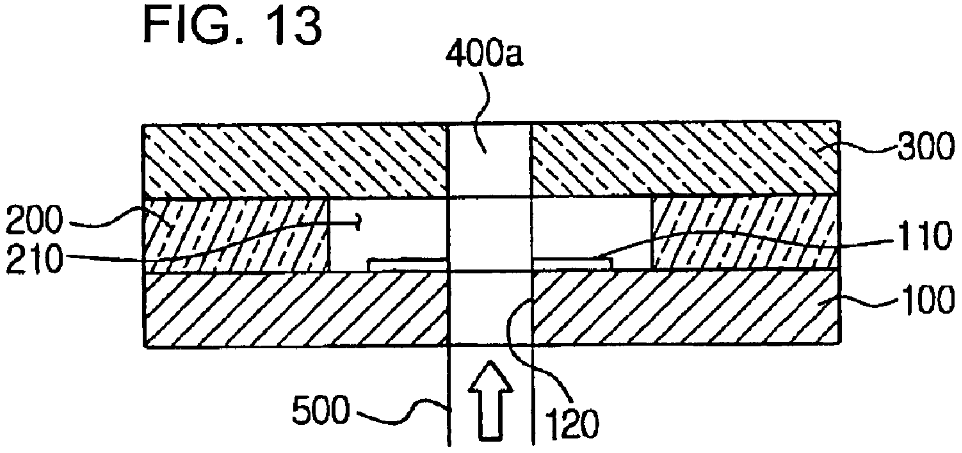

Then, as shown in FIG. 13, a laser beam 500 is radiated to a nozzle-formed area 400*a* of the nozzle plate portion 300 by using the ink feeding passage 120 of the substrate 100 as a mask, and then the nozzle 400 is formed to be used as an ink discharge passage of the ink chamber 210, in the nozzle plate portion 300. The laser beam 500 is radiated in a direction from the ink chamber 210 toward an outside portion of the nozzle plate portion 300, efficiently forming the nozzle 400 in a tapered pattern, i.e., the nozzle 400 being narrower in diameter in the outside portion than in the inside portion.

Like the previous embodiment, this embodiment may include the operation of the coating the hydrophobic substance on the surface of the nozzle plate portion 300 prior to the forming of the nozzle 400, the operation of removing various types of by-products resulting from the nozzle formation and the operation of modifying an inner portion of the ink chamber 210 and the ink feeding passage 120 after the forming of the nozzle.

Figure 14:
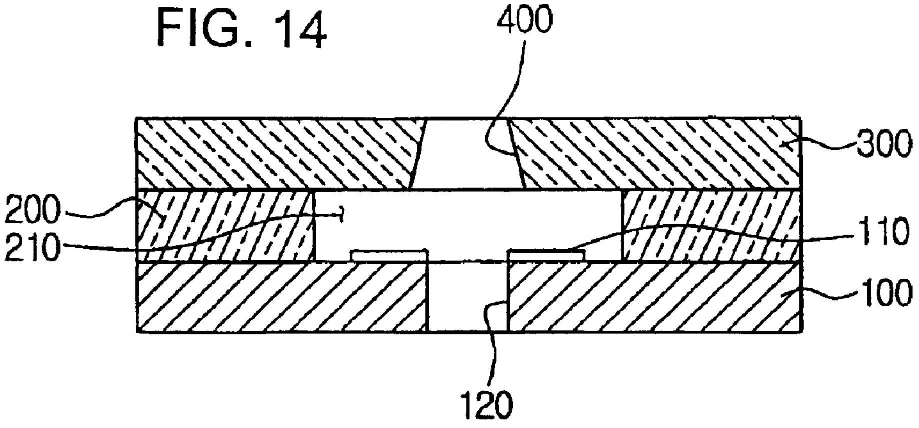
FIG. 14 is a cross-sectional view showing a head made by the method of manufacturing the head of the inkjet printer according to the embodiment shown in FIGS. 8 through 13.

FIG. 14 is a cross-sectional view showing the head of the inkjet printer made according to this embodiment. As shown in FIG. 14, the basic structure of the head embodiment is similar to that of the head of the previous embodiment of the present invention as shown in FIG. 7. Accordingly, the description about the effects obtained by the structural characteristics of the second preferred embodiment will be replaced by the description made above with respect to the previous embodiment.

As described above, according to the present invention, since the nozzle 40, 400 is formed by radiating the laser beam to the nozzle plate 30, 300 through the ink feeding passage 12, 120 of the substrate 10, 100 after the nozzle plate 30, 300 is attached to the substrate 10, 100, the accuracy of the nozzle 40, 400 in form and position is improved. Also, with only one radiation of the laser beam, the nozzle 40, 400 in tapered pattern, i.e., the nozzle 40, 400 having a smaller diameter from inside to the outside, is easily achieved since the inside portion of nozzle 40, 400 absorbs more energy of the laser beam 50 than the outside portion of the nozzle 40, 400, which is desirable for the efficient discharge of the ink.

Further, according to the present invention, since the ink feeding passage 12, 120 and the substrate 10, 100 are used as a mask when the laser beam is radiated to the nozzle plate 30, 300 in order to form a nozzle 40, 400, the nozzle 40, 400 is aligned with the ink feeding passage 12, 120 accurately, and accordingly, the straightforwardness of the ink droplets is improved. As a result, without having to employ the separate equipments or processes for alignment of the nozzle 40, 400 and the ink feeding passage 12, 120, the nozzle 40, 400 is aligned with the ink feeding passage 12, 120 easily and accurately, and the manufacturing process becomes simpler.

That is, according to the present invention, the head having an improved efficiency of ink discharge is made, and accordingly, the quality and the productivity of the head improve.

While the invention has been shown and described with reference to the preferred embodiments thereof, it will be understood by those skilled in the art that various changes in form and details may be made therein without departing from the sprit and scope of the invention as defined by the appended claims.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A method of manufacturing a head of an inkjet printer comprising a substrate having a heater and an ink feeding passage, an ink chamber communicating with the ink feeding passage, and a nozzle plate, the method comprising:

forming the ink chamber between the ink feeding passage and the nozzle plate; and forming a nozzle in the nozzle plate by perforating the nozzle plate in a direction from an inside surface of the nozzle plate disposed adjacent the ink chamber toward an outside surface of the nozzle plate opposite to the inside surface of the nozzle plate.

2. The method of claim 1, wherein the forming of the nozzle comprises radiating a laser beam on the inside surface of the nozzle plate to form the nozzle.

3. A method in a head of an inkjet printer, comprising:

providing a substrate having a passage, a nozzle plate formed on the substrate, and an ink chamber formed between the substrate and the nozzle plate; and perforating the nozzle plate from an inside surface of the nozzle plate toward an outside surface of the nozzle plate to form a nozzle communicating with the passage through the ink chamber.

4. The method of claim 3, wherein the perforating of the nozzle plate comprises radiating a laser beam on the inside surface of the nozzle plate.

5. The method of claim 4, wherein the laser beam is radiated on the nozzle plate through the passage of the substrate.

6. The method of claim 4, wherein the laser beam is radiated on the nozzle plate through the ink chamber.

7. The method of claim 3, wherein the inside surface of the nozzle plate is closer to the ink chamber than the outside surface of the nozzle plate.

8. The method of claim 3, wherein the nozzle is defined by a circumferential side surface of a frustum of a cone.

9. The method of claim 3, wherein the nozzle has a diameter of the inside surface of the nozzle plate greater than that of the outside surface of the nozzle plate.

10. The method of claim 3, further comprising coating a hydrophobic substance on an atmosphere contacting surface of the nozzle plate.

11. The method of claim 3, further comprising melting or washing by-product of the nozzle plate generated when the nozzle is formed on the nozzle plate from the ink chamber.

12. The method of claim 3, further comprising forming a dry film between the substrate and the nozzle plate, the dry film having a hole communicating with the nozzle and the passage, the hole forming the ink chamber.

13. The method of claim 3, further comprising:

forming a dry film between the substrate and the nozzle plate;

attaching the substrate to the nozzle plate; and removing a portion of the dry film to form the ink chamber.

14. The method of claim 3, further comprising growing a semiconductor layer on the substrate to a height to form an in chamber wall defining the ink chamber.

15. The method of claim 14, further comprising growing another semiconductor layer on the semiconductor layer of the ink chamber wall to a second predetermined thickness to form the nozzle plate.

16. The method of claim 3, further comprising forming a heater on the substrate and within the ink chamber.

17. The method of claim 16, further comprising:

forming a sacrificial layer on a heater formed area around the heater; and removing the sacrificial layer to form the ink chamber after the passage is formed.

18. The method of claim 3, further comprising:

forming a sacrificial layer having a predetermined height on the substrate; and removing the sacrificial layer to form the ink chamber.

19. The method of claim 18, wherein the sacrificial layer is removed after the nozzle plate is formed on the sacrificial layer.

20. The method of claim 18, wherein the sacrificial layer is formed before the passage is formed on the substrate.

21. The method of claim 18, wherein the sacrificial layer is removed after the passage is formed on the substrate.

22. The method of claim 18, further comprising forming the substrate except an area corresponding to the sacrificial layer to have the same height as the sacrificial layer after the sacrificial layer is formed.

23. The method of claim 22, wherein the sacrificial layer is removed after the substrate is formed to have the same height as the sacrificial layer.

24. The method of claim 18, wherein the sacrificial layer is removed before the nozzle plate is formed on the substrate.

25. The method of claim 18, further comprising growing a semiconductor layer on the substrate except a sacrificial layer formed area to the same height of the sacrificial layer to form an ink chamber wall defining the ink chamber.

26. The method of claim 25, further comprising growing another semiconductor layer on the semiconductor layer of the ink chamber wall to a second predetermined thickness to form the nozzle plate.

* * * * *

UNITED STATES PATENT AND TRADEMARK OFFICE

CERTIFICATE OF CORRECTION

PATENT NO. : 6,922,892 B2
APPLICATION NO. : 10/200973
DATED : August 2, 2005
INVENTOR(S) : Il Kim et al.

It is certified that error appears in the above-identified patent and that said Letters Patent is hereby corrected as shown below:

Column 9,
Line 3, replace “in” with -- ink --.

Signed and Sealed this

Twenty-seventh Day of June, 2006

JON W. DUDAS
*Director of the United States Patent and Trademark Office*